US010130997B2

(12) United States Patent
Ishizu et al.

(10) Patent No.: US 10,130,997 B2
(45) Date of Patent: Nov. 20, 2018

(54) MAIN SHAFT DEVICE AND MACHINE TOOL PROVIDED WITH SAME

(71) Applicant: MITSUBISHI HEAVY INDUSTRIES MACHINE TOOL CO., LTD., Ritto-shi, Shiga (JP)

(72) Inventors: Kazuyuki Ishizu, Tokyo (JP); Hidefumi Omokawa, Tokyo (JP); Tatsuro Takagi, Tokyo (JP)

(73) Assignee: MITSUBISHI HEAVY INDUSTRIES MACHINE TOOL CO., LTD., Shiga (JP)

( * ) Notice: Subject to any disclaimer, the term of this patent is extended or adjusted under 35 U.S.C. 154(b) by 0 days.

(21) Appl. No.: 15/325,773

(22) PCT Filed: Jul. 31, 2015

(86) PCT No.: PCT/JP2015/071743
§ 371 (c)(1),
(2) Date: Jan. 12, 2017

(87) PCT Pub. No.: WO2016/031488
PCT Pub. Date: Mar. 3, 2016

(65) Prior Publication Data
US 2017/0165761 A1 Jun. 15, 2017

(30) Foreign Application Priority Data
Aug. 29, 2014 (JP) ................. 2014-175048

(51) Int. Cl.
*B23B 31/10* (2006.01)
*B23Q 11/00* (2006.01)
(Continued)

(52) U.S. Cl.
CPC .......... *B23B 31/001* (2013.01); *B23B 31/265* (2013.01); *B23Q 11/005* (2013.01);
(Continued)

(58) Field of Classification Search
CPC .... B23B 31/001; B23Q 17/006; B23Q 11/005
See application file for complete search history.

(56) References Cited

U.S. PATENT DOCUMENTS

| 3,603,203 | A | * | 9/1971 | Rhodes | ................ | B23Q 17/006 408/11 |
| 4,504,824 | A | * | 3/1985 | Mello | ................... | B23B 49/001 340/680 |
| 8,827,608 | B2 | | 9/2014 | Fujimura et al. | | |

FOREIGN PATENT DOCUMENTS

| DE | 19848371 A1 * | 5/2000 | .......... B23B 31/001 |
| JP | 10-225845 A | 8/1998 | |

(Continued)

OTHER PUBLICATIONS

International Search Report and Written Opinion of the International Searching Authority dated Oct. 20, 2015 in International Application No. PCT/JP2015/071743 with English Translation.

*Primary Examiner* — Alan Snyder
(74) *Attorney, Agent, or Firm* — Birch, Stewart, Kolasch & Birch, LLP

(57) ABSTRACT

This device is provided with: a main shaft (20) onto which a tool (100) is detachably mounted; a rod (30) slidably supported by the main shaft (20) and configured to attach or detach the tool (100) to or from the main shaft (20) through a sliding action; a fluid channel (32) formed in the rod (30); fluid feed device (51, 70) configured to feed a fluid into the fluid channel (32); a plurality of fluid channels for seating detection (24) for detecting when the main shaft (20) and the tool (100) are in a seated state, the fluid channels for seating detection (24) being formed in the main shaft (20) so as to communicate with the fluid channel (32) when the rod (30) is positioned at a first position; and a plurality of fluid channels for cleaning (25) for cleaning seating portions of the main shaft (20) and the tool (100), the fluid channel for (Continued)

cleaning (25) being formed in the main shaft (20) so as to communicate with the fluid channel (32) when the rod (30) is positioned at a second position different from the first position.

5 Claims, 4 Drawing Sheets

(51) Int. Cl.
*B23B 31/00* (2006.01)
*B23B 31/26* (2006.01)
(52) U.S. Cl.
CPC ....... *B23B 2231/24* (2013.01); *B23B 2231/26* (2013.01); *B23B 2270/30* (2013.01)

(56) References Cited

FOREIGN PATENT DOCUMENTS

| | | |
|---|---|---|
| JP | 2002-126966 A | 5/2002 |
| JP | 2006-334676 A | 12/2006 |
| JP | 2007-307651 A | 11/2007 |
| JP | 2009-241187 A | 10/2009 |

\* cited by examiner

MAIN SHAFT DEVICE AND MACHINE TOOL PROVIDED WITH SAME

TECHNICAL FIELD

The present invention relates to a main shaft device onto which is detachably mounted a tool, or a tool holder to which the tool is attached, and which is capable of using air to detect a seated state of the tool or the tool holder and to perform cleaning of seating portions thereof, and to a machine tool provided with the main shaft device.

BACKGROUND ART

In a machine tool, when replacing a tool, or a tool holder to which the tool is attached, mounted on a main shaft, chips generated by machining sometimes attach to seating portions of the tool or tool holder and the main shaft. In a state in which the chips are caught up in the seating portions in this manner, the main shaft is not properly in close contact with the tool or the tool holder, and thus the positioning of the tool with respect to the main shaft, and specifically, the positioning of the tool with respect to the machine tool, cannot be accurately performed. Thus, if machining is performed in this state, a negative impact on machining accuracy is incurred, and there is a risk of damaging the tool or the main shaft.

A seating detection device has been developed (see Patent Document 1), which can detect whether or not the tool or the tool holder has been mounted in close contact with the main shaft. With this device, air is fed to the seating portions of the tool or the tool holder and the main shaft, and a seated state of the tool or the tool holder and the main shaft is detected through pressure changes of the air.

Further, in order to inhibit the chips from becoming caught up in the seating portions, a cleaning device has been developed that removes the chips and the like attached to the seating portions. With this means, air is fed to the seating portions of the tool or the tool holder and of the main shaft, and the chips and the like attached to the seating portions are removed by being blown away by spraying the air onto the seating portions.

CITATION LIST

Patent Document

Patent Document 1: Japanese Unexamined Patent Application Publication No. 2009-241187A

SUMMARY OF INVENTION

Technical Problem

However, in a conventional machine tool provided with the above-described seating detection device and cleaning device, an air feed channel for detecting the seated state and an air feed channel for cleaning the seating portions are provided in the same system, and there is a risk that the detection of the seated state and the cleaning of the seating portions are not performed using an air feed of an appropriate flow rate.

When detecting the seated state of the tool or the tool holder and the main shaft, it is sufficient to be able to detect the pressure changes of the air, and a small flow rate of the fed air is sufficient. Thus, when taking the environment into account, it is preferable for the seated state of the tool or the tool holder and the main shaft to be detected using a small flow rate of air.

On the other hand, when removing the chips and the like attached to the seating portions of the tool or the tool holder and the main shaft, the chips and the like can be reliably removed by strongly spraying the air. Thus, in order to cause the main shaft and the tool or the tool holder to be properly in close contact, it is preferable to remove the chips and the like attached to the seating portions using a large flow rate of air.

In light of the foregoing, it is an object of the present invention to enable detection of a close-contact state of a main shaft device and a tool and air cleaning of close-contact portions of the main shaft device and the tool to be performed with respectively appropriate air flow rates.

Solution to Problem

A main shaft device according to a first aspect of the invention to solve the above-mentioned problems, includes: a main shaft, onto a seating face of which is detachably mounted a tool that performs predetermined machining on an object to be machined or a tool holder to which the tool is attached; a rod slidably supported by the main shaft and configured to attach or detach the tool or the tool holder to or from the main shaft through a sliding action; a fluid channel formed in the rod; fluid feed device configured to feed a fluid into the fluid channel; a plurality of fluid channels for seating detection for detecting when the main shaft and the tool or the tool holder are in a seated state, the fluid channels for seating detection being formed in the main shaft so as to communicate with the fluid channel when the rod is positioned at a first position as a result of a sliding action; and a plurality of fluid channels for cleaning for cleaning seating portions of the main shaft and the tool or the tool holder, the fluid channels for cleaning being formed in the main shaft so as to communicate with the fluid channel when the rod is positioned at a second position as a result of a sliding action, the second position being different from the first position.

With respect to the main shaft device according to the first aspect of the invention, in the main shaft device according to a second aspect of the invention to solve the above-mentioned problems, the first position is an intermediate position located between an unclamped position at which the tool or the tool holder is unclamped, and a clamped position at which the tool or the tool holder is reliably clamped, and the second position is the unclamped position.

With respect to the main shaft device according to the first aspect and the second aspect of the invention, in the main shaft device according to a third aspect of the invention to solve the above-mentioned problems, the seating face has an orthogonal face that is orthogonal to the main shaft and a tapered face oriented in a different direction to the main shaft and the orthogonal face. Each of the fluid channels for seating detection opens in the orthogonal face, and each of the fluid channels for cleaning opens in the tapered face.

With respect to the main shaft device according to any one of the first to third aspects of the invention, in the main shaft device according to a fourth aspect of the invention to solve the above-mentioned problems, the fluid channels for seating detection and the fluid channels for cleaning are alternately formed at intervals of a predetermined angle in the circumferential direction of the main shaft.

A machine tool according to a fifth aspect of the invention to solve the above-mentioned problems includes a main shaft device provided with a main shaft onto which is detachably mounted a tool that performs predetermined machining on an object to be machined or a tool holder to which the tool is attached, and the main shaft device is the device according to any one of the first to fourth aspects of the invention.

Advantageous Effects of Invention

According to the main shaft device according to the first aspect of the invention, a plurality of fluid channels for seating detection and a plurality of fluid channels for cleaning are provided in two different systems, and thus, for example, by forming each of the fluid channels for seating detection and each of the fluid channels for cleaning having mutually different channel cross-sectional areas, a fluid flow rate when detecting a seated state and a fluid flow rate when cleaning seating surfaces can be changed. Specifically, the detection of a close-contact state of the main shaft device and the tool or tool holder, and the cleaning of close-contact portions of the main shaft device and the tool or tool holder can be performed using respectively appropriate fluid flow rates.

Further, the communication of each of the fluid channels for seating detection and the fluid channel, and the communication of each of the fluid channels for cleaning and the fluid channel are respectively caused to communicate at different positions in the sliding action of the rod. For example, a timing at which the rod is positioned in the first position in the sliding action of the rod and a timing at which the rod is positioned in the second position in the sliding action of the rod can be controlled using a direction selector valve provided with an actuator or the like, and at the same time, a pressure reducing valve can be used to respectively adjust the pressures of fluid fed to each of the fluid channels for seating detection and each of the fluid channels for cleaning, and fluid flow rates can be switched. Specifically, the detection of the close-contact state of the main shaft device and the tool, and the cleaning of the close-contact portions of the main shaft device and the tool can be performed using respectively appropriate fluid flow rates.

According to the main shaft device according to the second aspect of the invention, detection of a close-contact state of the main shaft device and the tool can be performed between a state in which the tool or the tool holder is unclamped and a clamped state in which the tool or tool holder is reliably clamped, namely, when the tool or tool holder is seated on the main shaft. The cleaning of the close-contact portions can be performed when the tool or tool holder is in the unclamped state.

According to the main shaft device according to the third aspect of the invention, each of the fluid channels for seating detection opens in the orthogonal face, and the close-contact state of the main shaft device and the tool can be accurately detected. Further, each of the fluid channels for cleaning opens in the tapered face, and thus the close-contact portions of the main shaft device and the tool can be reliably cleaned.

According to the main shaft device according to the fourth aspect of the invention, the detection of the close-contact state of the main shaft device and the tool, and the cleaning of the close-contact portions of the main shaft device and the tool can be performed substantially uniformly in the circumferential direction.

According to the machine tool according to the fifth aspect of the invention, in the machine tool, the detection of the close-contact state of the main shaft device and the tool, and the air cleaning of the close-contact portions of the main shaft device and the tool can be performed using respectively appropriate air flow rates.

DESCRIPTION OF EMBODIMENTS

The following describes in detail an embodiment of a main shaft device according to the present invention, with reference to the drawings. The present invention is of course not limited to the following embodiment, and it goes without saying that various modifications are possible insofar as they do not depart from the spirit and scope of the present invention.

First Embodiment

The following describes the structure of a main shaft device according to a first embodiment of the present invention with reference to FIGS. 1 to 4.

Figure 1:
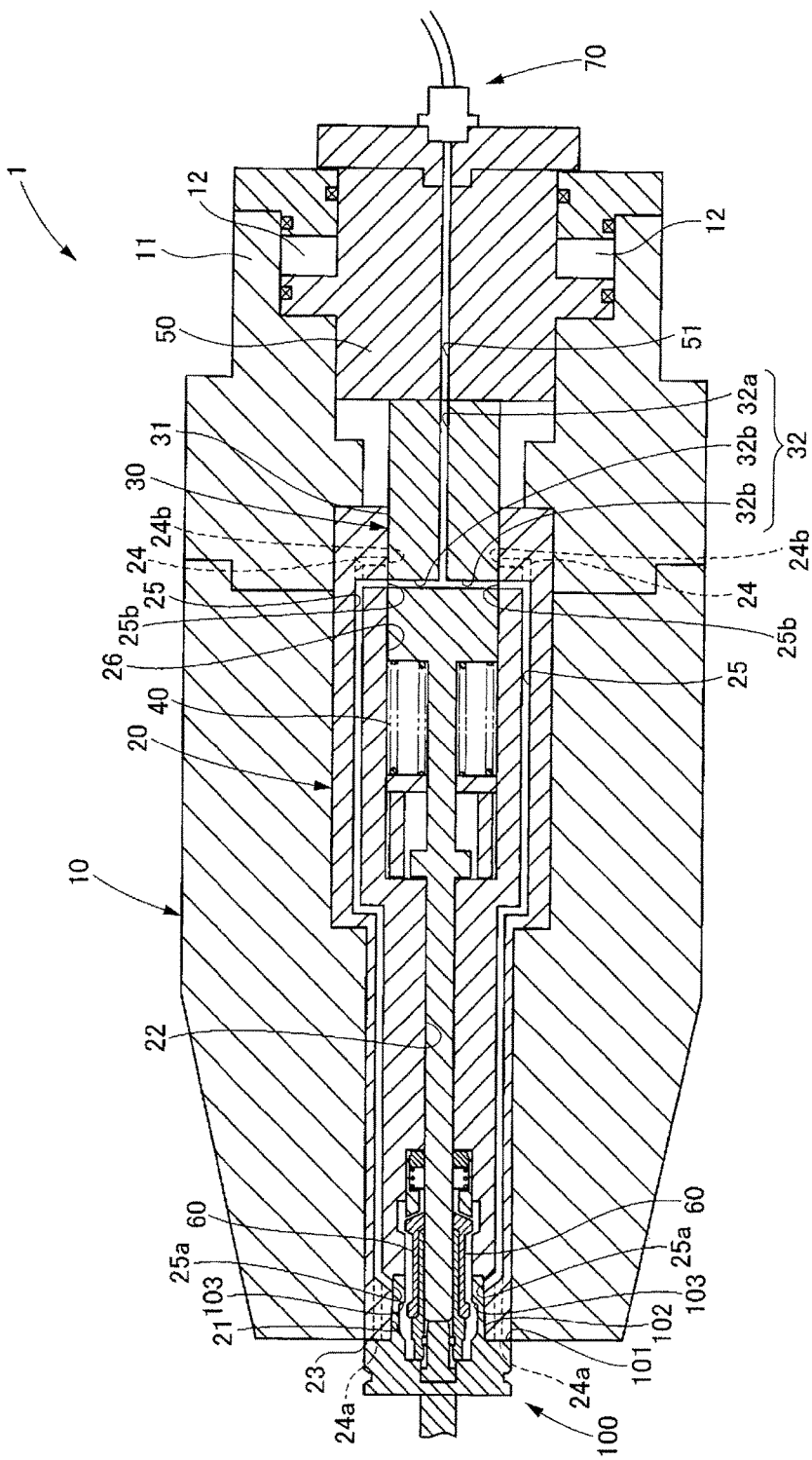
FIG. 1 is an explanatory diagram illustrating the structure of a main shaft device according to a first embodiment.
Figure 2:
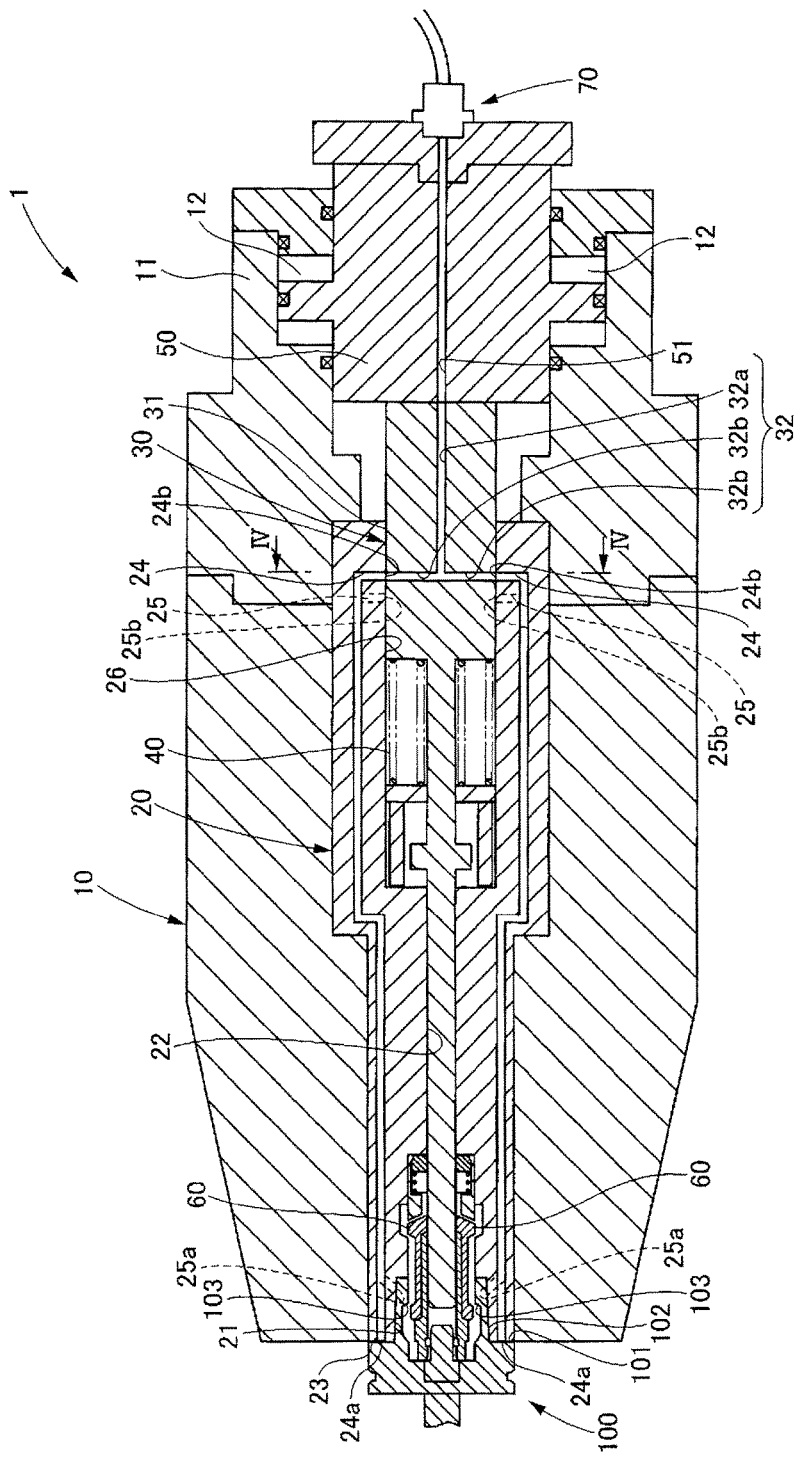
FIG. 2 is an explanatory diagram illustrating the structure of the main shaft device according to the first embodiment.
Figure 3:
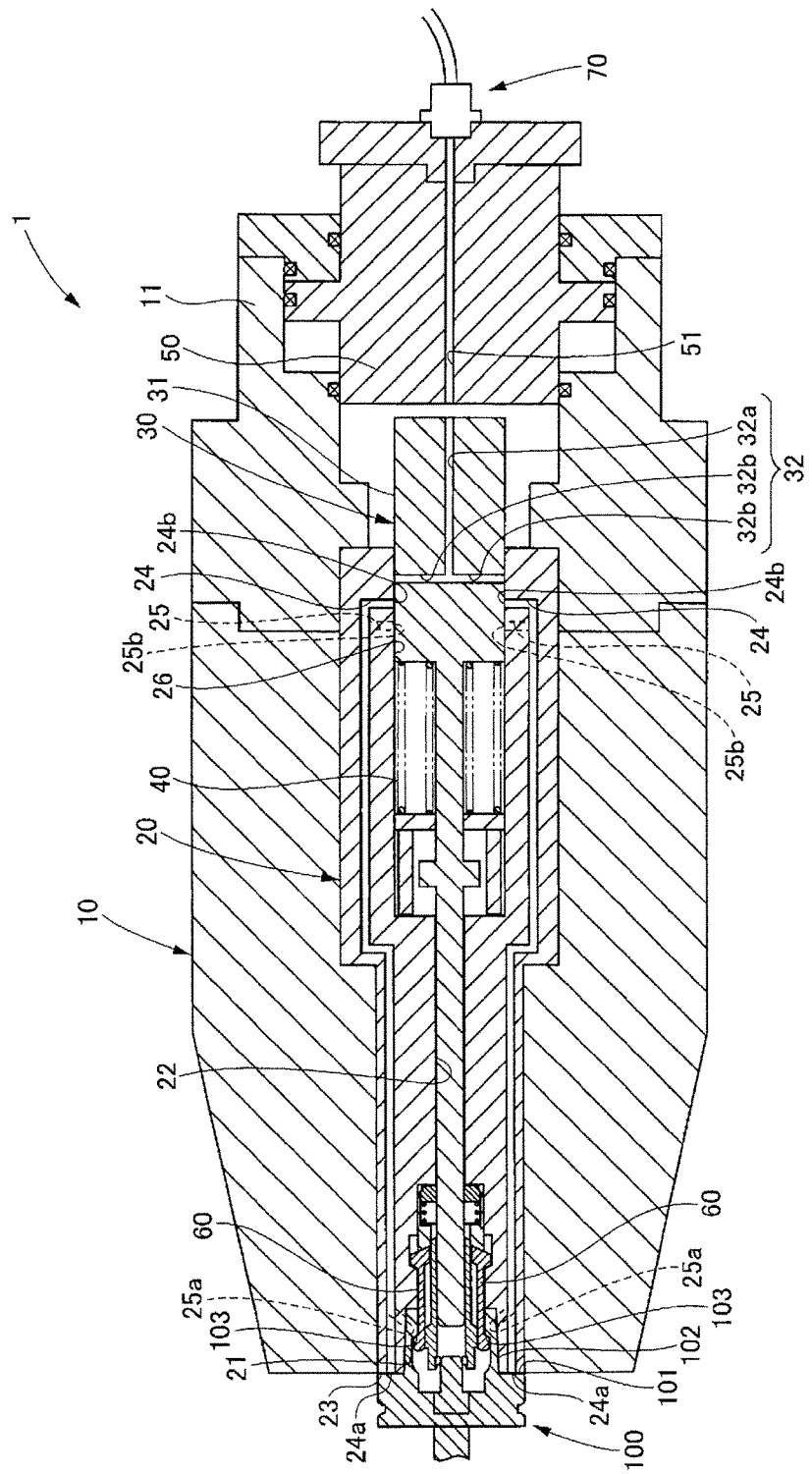
FIG. 3 is an explanatory diagram illustrating the structure of the main shaft device according to the first embodiment.

As illustrated in FIGS. 1 to 3, a main shaft device 1 of a machine tool has detachably mounted thereon a tool 100, which performs predetermined machining on a workpiece (an object to be machined) that is not illustrated. Of course, a tool holder (not illustrated) to which a tool is attached may be detachably mounted on the main shaft device 1.

The main shaft device 1 is provided with a cylindrically-shaped main shaft head 10, and a main shaft 20 is rotatably supported inside the main shaft head 10. A tapered hole (a seating face) 21 and a shaft hole 22 are continuously formed in the main shaft 20 along an axial center thereof. A tip end side (the left side in FIGS. 1 to 3) of the tapered hole 21 opens in a tip end face (a seating face) 23, and a rear end side (the right side in FIGS. 1 to 3) of the tapered hole 21 communicates with the shaft hole 22. The inner diameter of the tapered hole 21 is formed to become gradually smaller from the tip end side toward the rear end side.

A rod 30 is supported in the shaft hole 22 of the main shaft 20 such that the rod 30 can slide in the axial direction thereof (in the left-right direction in FIGS. 1 to 3). The rod 30 rotates together with the main shaft 20, and is also biased toward the rear end side of the main shaft 20 by a disk spring 40, which is an elastic device (biasing device) provided in substantially the center of the main shaft 20. Further, a cylinder portion 11 is provided on the rear end side of the main shaft head 10, and a piston 50 is supported in the cylinder portion 11 such that the piston 50 can slide in the axial direction of the main shaft 20.

Pressure oil is supplied to or discharged from a space 12 formed by the piston 50 and the cylinder portion 11, by pressure oil feed/discharge devices (not illustrated). Thus, the piston 50 can be caused to slide toward the tip end side by feeding the pressure oil into the space 12. The tip end side of the piston 50 that has been moved toward the tip end side comes into contact with the rear end side of the rod 30, and can cause the rod 30 to resist the biasing force of the disk spring 40 and move to the tip end side of the main shaft 20.

Further, a collet 60 is provided on the tip end side of the main shaft 20, and the collet 60 is moved in the radial direction of the main shaft 20 by the movement of the rod 30 in the axial direction. In this way, by the collet 60 moving in the radial direction of the main shaft 20 to be in a fully open state or a fully closed state, the tool 100 can be mounted on or removed from the main shaft device 1.

As illustrated in FIGS. 1 to 3, the tool 100 is a two-plane constraint type tool, and an end face 101 and a tapered portion 102, which are close-contact faces (seating portions) with the main shaft device 1, are provided on the rear end side (the right side in FIGS. 1 to 3) of the tool 100. The end face 101 is in close contact with the tip end face 23 of the main shaft 20. Further, the tapered portion 102 is in close contact with the tapered hole 21 of the main shaft 20, and the outer diameter of the tapered portion 102 is formed to become gradually smaller from the tip end side toward the rear end side.

Replacement of the tool 100 on the main shaft device 1 is performed by feeding and discharging the pressure oil to and from the space 12 of the cylinder portion 11. When the machining of the workpiece (not illustrated) is ended, and the rotation of the main shaft 20 is stopped, the pressure oil is fed into the space 12 of the cylinder portion 11 (see FIG. 3). As a result of the pressure oil fed into the space 12, a pressing force toward the tip end side of the main shaft 20 acts on the piston 50, and the piston 50 moves toward the tip end side as a result of the pressing force. When the piston 50 moves toward the tip end side and the tip end side of the piston 50 comes into contact with the rear end side of the rod 30, the pressing force caused by the pressure oil fed into the space 12 acts on the rod 30 via the piston 50 (see FIG. 2). Then, when the pressure oil is further fed, due to the resulting pressing force, the piston 50 and the rod 30 resist the biasing force of the disk spring 40 and are moved toward the tip end side of the main shaft 20 (see FIG. 1).

As illustrated in FIG. 1, when the rod 30 moves to an unclamped position on the tip end side of the main shaft 20, the collet 60 moves toward the inside of the main shaft 20 in the radial direction, and reaches the fully closed state. As a result, the engagement of an engaging portion 103 between the collet 60 and the tool 100 is released. Specifically, the tool 100 is in a state of being unclamped from the main shaft 20. Then, the tool 100 in the unclamped state is detached from the main shaft 20, and replaced with another of the tools 100.

The other tool 100 to be newly mounted on the main shaft device 1 is conveyed toward the tip end side of the main shaft 20. Then, when the tapered portion 102 of the tool 100 starts to be inserted into (mounted in) the tapered hole 21 of the main shaft 20, the pressure oil fed into the space 12 of the cylinder portion 11 is discharged, and the piston 50 and the rod 30 are moved toward the rear end side of the main shaft 20 by the biasing force of the disk spring 40.

When the rod 30 moves from the unclamped position (see FIG. 1) toward the rear end side of the main shaft 20 through an intermediate position (a seating position) (see FIG. 2), and then further to a clamped position on the rear end side of the main shaft 20, the collet 60 moves toward the outside of the main shaft 20 in the radial direction and reaches the fully open state. As a result, the engaging portion 103 between the collet 60 and the tool 100 is engaged. Specifically, the tool 100 is in a state of being clamped to the main shaft 20.

The rod 30 is controlled by an actuator and a direction selector valve (both not illustrated), and is configured to move in sequence between the above-described unclamped position, intermediate position and clamped position. Here, the unclamped position of the rod 30 is a position in which the collet 60 is fully closed, namely, a position at which the replacement of the tool 100 is performed. The clamped position of the rod 30 is a position in which the collet 60 is fully open, namely, a position at which the machining by the tool 100 is performed. The intermediate position of the rod 30 is a position between the unclamped position and the clamped position.

In the main shaft device 1, cleaning device configured to clean the close-contact faces of the main shaft device 1 and the tool 100 when the tool 100 is mounted or detached, and seating detection device configured to detect whether or not the tool 100 is in close contact with the main shaft device 1 and is reliably mounted, are provided.

An air feed device (fluid feed device) 70 is mounted on a central portion of the rear end side of the piston 50, and a first air channel 51 is formed passing through an axial center of the piston 50. A second air channel 32 is formed in the rod 30, such that a first end thereof opens in a central portion of the rear end side of the rod 30 so as to communicate with the first air channel 51 of the piston 50 when the rear end side of the rod 30 comes into contact with the tip end side of the piston 50.

Figure 4:
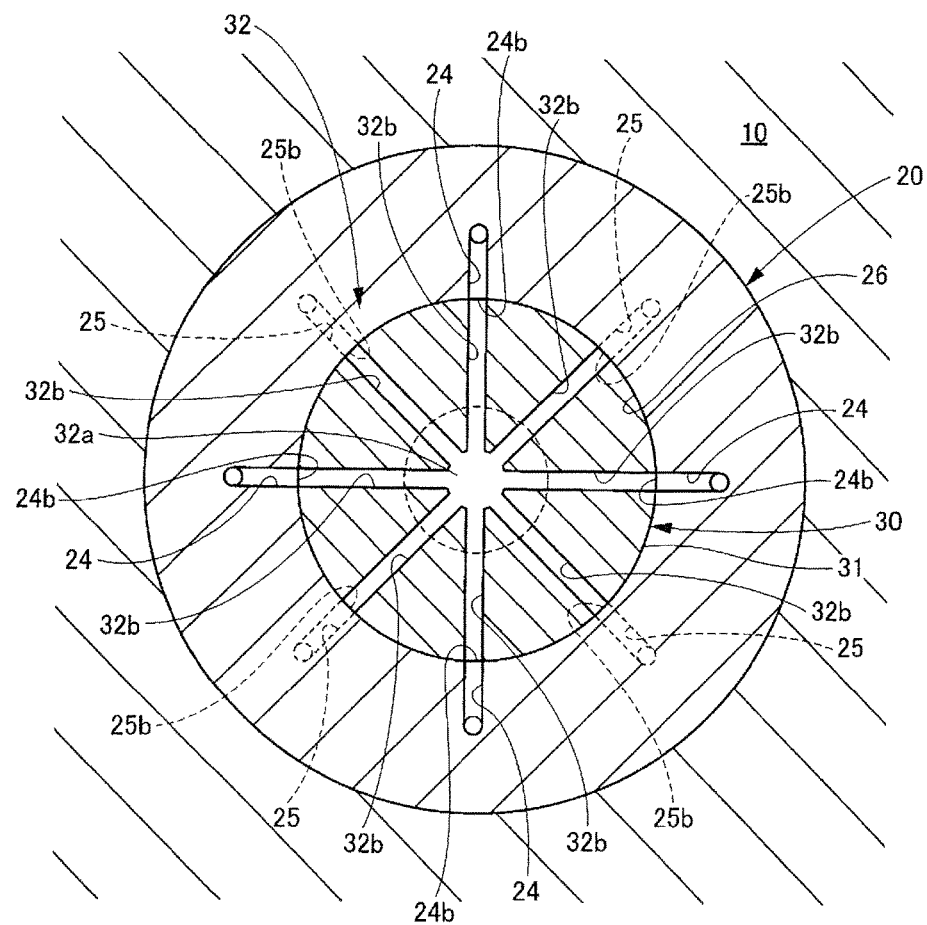
FIG. 4 is a cross-sectional view (as seen in the direction of arrows on IV-IV in FIG. 2) illustrating air channels in the main shaft device according to the first embodiment.

Second ends of the second air channel 32 are formed to open in a plurality of locations in an outer peripheral surface 31 of the rod 30, and the second air channel 32 is configured by an axial direction extending portion 32a that extends in the axial direction and opens in the central portion of the rear end side of the rod 30, and a plurality of (eight in the present embodiment) radial direction extending portions 32b that extend in the radial direction from the tip end side of the axial direction extending portion 32a and open in the outer peripheral surface 31 of the rod 30. As illustrated in FIG. 4, the radial direction extending portions 32b of the second air channel 32 are provided at equal angle intervals (at 45 degree angles in the present embodiment) in the circumferential direction of the rod 30.

In the main shaft 20, a plurality of (four in the present embodiment) seating detection air channels 24 (see FIGS. 2 and 4), and a plurality of (four in the present embodiment) cleaning air channels 25 (see FIGS. 1 and 4) are provided so as to be communicable with the second air channel 32 of the rod 30. As illustrated in FIG. 4, the plurality of seating detection air channels 24 and cleaning air channels 25 are provided alternately at equal angle intervals (45 degrees in the present embodiment) in the circumferential direction of the main shaft 20.

First ends of the seating detection air channels 24 open in predetermined positions in an inner peripheral surface 26 of the main shaft 20, and the seating detection air channels 24 communicate with the second air channel 32 when the rod 30 is in the above-described intermediate position. Further, second ends of the seating detection air channels 24 open in the tip end face 23 of the main shaft 20, and, when the rod 30 in the intermediate position, air of a predetermined pressure that is fed from the air feed device 70 is sprayed from the tip end face 23 of the main shaft 20, via the first air channel 51 of the piston 50, the second air channel 32 of the rod 30, and the seating detection air channels 24 of the main shaft 20.

Thus, when the rod 30 is in the intermediate position, the seated state of the main shaft device 1 and the tool 100 can be detected by pressure changes in the air fed from the air feed device 70. Specifically, when the tip end face 23 and the end face 101 are in close contact, opening portions (air spray holes) 24a of the seating detection air channels 24 are closed off by the end face 101 of the tool 100. As a result, the air is not sprayed and the air pressure rises. The fact that the main shaft device 1 and the tool 100 are reliably in a close-contact state (are seated) can therefore be detected.

On the other hand, when the tip end face 23 and the end face 101 are not in close contact, the opening portions (the air spray holes) 24*a* of the seating detection air channels 24 are not closed off by the end face 101 of the tool 100. Thus, the air pressure does not rise even when the air is sprayed. The fact that the main shaft device 1 and the tool 100 are not reliably in the close-contact state (are not seated) can therefore be detected.

First ends of the cleaning air channels 25 open in predetermined positions in the inner peripheral surface 26 of the main shaft 20, and the cleaning air channels 25 communicate with the second air channel 32 when the rod 30 is in the above-described unclamped position. Specifically, opening portions 25*b* at the first ends of the cleaning air channels 25 are formed in different positions from opening portions 24*b* at the first ends of the seating detection air channels 24, in the circumferential direction and the axial direction of the main shaft 20. Further, second ends of the cleaning air channels 25 open in the tapered hole 21 of the main shaft 20, and, when the rod 30 in the unclamped position, air of a predetermined pressure that is fed from the air feed device 70 is sprayed toward the tapered portion 102 of the tool 100 from opening portions 25*a* that open in the tapered hole 21 of the main shaft 20, via the first air channel 51 of the piston 50, the second air channel 32 of the rod 30, and the cleaning air channels 25 of the main shaft 20.

Thus, when the rod 30 is in the unclamped position, the close-contact faces of the main shaft device 1 and the tool 100 are cleaned by the air fed from the air feed device 70. Specifically, when the tapered hole 21 and the tapered portion 102 are not in close contact while the tool 100 is in the unclamped state, since the air of the predetermined pressure is sprayed from the opening portions 25*a* of the cleaning air channels 25, chips and the like attached to the tapered portion 102 of the tool 100 can be blown away, and at the same time, chips and the like attached to the end face 101 of the tool, and to the tapered hole 21 and the tip end face 23 of the main shaft 20 can also be blown away by the power of the sprayed air.

Next, operations of the main shaft device 1 according to the present embodiment will be described with reference to FIGS. 1 to 4.

When the machining of the workpiece (not illustrated) by the machine tool provided with the main shaft device 1 is ended, and the rotation of the main shaft 20 is stopped, the pressure oil is fed into the space 12 of the cylinder portion 11 (see FIG. 3) by a pressure oil feed/discharge device (not illustrated). As a result of the pressure oil fed into the space 12, a pressing force toward the tip end side of the main shaft 20 acts on the piston 50, and the piston 50 moves toward the tip end side as a result of the pressing force.

When the piston 50 moves toward the tip end side and the tip end side of the piston 50 comes into contact with the rear end side of the rod 30, the pressing force caused by the pressure oil fed into the space 12 acts on the rod 30 via the piston 50. Then, when the pressure oil is further fed, due to the resulting pressing force, the piston 50 and the rod 30 resist the biasing force of the disk spring 40 and are moved toward the tip end side of the main shaft 20.

When the piston 50 and the rod 30 move toward the tip end side and the rod 30 reaches the intermediate position, the second air channel 32 of the rod 30 communicates with the seating detection air channels 25*a* of the main shaft 20 (see FIG. 2). Further, the air of the predetermined pressure fed from the air feed device 70 mounted on the rear end side of the piston 50 is fed into the seating detection air channels 24 of the main shaft 20, via the first air channel 51 of the piston 50, and the second air channel 32 of the rod 30.

At this time, the tool 100 is not reliably mounted on the main shaft device 1, namely, is not in the clamped state, but a state is obtained in which the close-contact faces of the main shaft device 1 and the tool 100 are in close contact. As a result, the opening portions (the air spray holes) 24*a* of the seating detection air channels 24 are blocked off by the end face 101 of the tool 100, and thus the air is not sprayed.

Further, when the pressure oil is fed into the space 12 of the cylinder portion 11, and the pressing force toward the tip end side of the main shaft 20 acting on the piston 50 increases due to the pressure oil fed into the space 12, the piston 50 and the rod 30 move further toward the tip end side of the main shaft 20 while resisting the biasing force of the disk spring 40. As a result, a state is obtained in which the second air channel 32 of the rod 30 does not communicate with the seating detection air channels 24 of the main shaft 20.

When the piston 50 and the rod 30 move further toward the tip end side and the rod 30 reaches the unclamped position, the second air channel 32 of the rod 30 communicates with the cleaning air channels 25 of the main shaft 20. Thus, the air of the predetermined pressure fed from the air feed device 70 mounted on the rear end side of the piston 50 is fed into the cleaning air channels 25 of the main shaft 20, via the first air channel 51 of the piston 50, and the second air channel 32 of the rod 30.

At this time, the collet 60 is in the fully closed state, and the tool 100 is in the unclamped state in which it can be detached from the main shaft device 1. Then, along with the tool 100 being detached from the main shaft 20, the air of the predetermined pressure fed from the air feed device 70 is sprayed from the opening portions (the air spray holes) 25*a* of the cleaning air channels 25 of the main shaft 20, via the first air channel 51 of the piston 50, the second air channel 32 of the rod 30, and the cleaning air channels 25 of the main shaft 20.

As well as the chips and the like attached to the tapered portion 102 of the tool 100 being blown away by the air of the predetermined pressure sprayed from the opening portions 25*a* of the cleaning air channels 25, the chips and the like attached to the end face 101 of the tool, and to the tapered hole 21 and the tip end face 23 of the main shaft 20 are also blown away by the power of the sprayed air, and the close-contact faces of the main shaft device 1 and the tool 100 are thus cleaned.

Then, the tool 100 that has been detached from the main shaft 20 is replaced with the other tool 100.

Next, the other tool 100 to be newly mounted on the main shaft device 1 is conveyed toward the tip end side of the main shaft 20. When the tapered portion 102 of the tool 100 approaches the tapered hole 21 of the main shaft 20, the tapered portion 102 of the other tool 100 to be newly mounted and the tapered hole 21 of the main shaft are cleaned by the air of the predetermined pressure that is fed from the air feed device 70 and sprayed from the opening portions 25*a* of the cleaning air channels 25, via the first air channel 51 of the piston 50, the second air channel 32 of the rod 30, and the cleaning air channels 25 of the main shaft 20.

Then, when the tapered portion 102 of the tool 100 starts to be inserted into (mounted in) the tapered hole 21 of the main shaft 20, the pressure oil fed into the space 12 of the cylinder portion 11 is discharged by the pressure oil feed/ discharge device (not illustrated), and the pressing force toward the tip end side of the main shaft 20 acting on the rod 30 and the piston 50 decreases. As a result, the piston 50 and the rod 30 are moved toward the rear end side of the main shaft 20 by the biasing force of the disk spring 40.

Further, when the pressure oil is discharged into the space 12 of the cylinder portion 11, and the piston 50 and the rod 30 are moved further toward the rear end side of the main shaft 20 by the biasing force of the disk spring 40, a state is obtained in which the second air channel 32 of the rod 30 does not communicate with the cleaning air channels 25 of the main shaft 20.

When the piston 50 and the rod 30 move further toward the rear end side and the rod 30 reaches the intermediate position, the second air channel 32 of the rod 30 communicates with the seating detection air channels 24 of the main shaft 20. Thus, the air of the predetermined pressure fed from the air feed device 70 mounted on the rear end side of the piston 50 is fed to the seating detection air channels 24 of the main shaft 20, via the first air channel 51 of the piston 50 and the second air channel 32 of the rod 30.

At this time, the tool 100 is not reliably mounted on the main shaft device 1, namely, is not in the clamped state, but a state is obtained in which the close-contact faces of the main shaft device 1 and the tool 100 are in close contact. Thus, the opening portions (the air spray holes) 24a of the seating detection air channels 24 of the main shaft 20 are blocked off by the end face 101 of the tool 100, and the air fed from the air feed device 70 is not sprayed. As a result, the pressure of the supplied air increases, and thus, the fact that the main shaft device 1 and the tool 100 are reliably in the close-contact state, namely, are in the clamped state, can be detected.

When a normal clamped state is detected, the pressure oil in the space 12 of the cylinder portion 11 is discharged and the pressing force toward the tip end side of the main shaft 20 acting on the piston 50 further decreases, and the piston 50 and the rod 30 are further moved toward the rear end side of the main shaft 20 by the biasing force of the disk spring 40. When the rod 30 reaches the clamped position, the collet 60 is in the fully open state, and the mounting of the tool 100 on the main shaft device 1 is complete.

Note that when the chips and the like are caught up on the close-contact faces of the main shaft device 1 and the tool 100, the close-contact faces of the main shaft device 1 and the tool 100 do not enter into the state of close contact. Thus, because the opening portions (the air spray holes) 24a of the seating detection air channels 24 of the main shaft 20 are not blocked off by the end face 101 of the tool 100, and the air fed from the air feed device 70 leaks through a gap created by the caught up chips and the like, the pressure of the fed air does not increase, and the fact that the main shaft device 1 and the tool 100 are not reliably in the close-contact state, namely, that there is a clamping abnormality, can be detected.

In the present embodiment, by feeding the pressure oil into the space 12 of the cylinder portion 11, the piston 50 and the rod 30 are caused to move toward the tip end side of the main shaft 20 while resisting the biasing force of the disk spring 40, and the rod 30 is caused to move to the intermediate position. In this way, the second air channel 32 and the seating detection air channels 24 are caused to communicate with each other. Of course, the main shaft device according to the present invention is not limited to the device in which the air channels are caused to communicate with each other by the feed of the pressure oil, as in the present embodiment. For example, an elastic device, such as a disk spring, a spring or the like (not illustrated) that resists the biasing force of the disk spring 40 may be separately provided, and the second air channel 32 and the seating detection air channels 24 may be caused to communicate with each other at a position of the rod 30 in which the biasing forces of the elastic device and the disk spring 40 are equal.

Further, in the present embodiment, the second air channel 32 is caused to communicate with the seating detection air channels 24 and the cleaning air channels 25 by causing the respective opening portions thereof to correspond to each other. Of course, the main shaft device according to the present invention is not limited to the device in which the air channels communicate with each other by aligning the positions of the holes that open in the air channels, as in the present embodiment. For example, groove portions may be provided that extend in the circumferential direction in at least one of the outer peripheral surface 31 of the rod 30 and the inner peripheral surface 26 of the main shaft 20.

With the main shaft device according to the present invention, seating detection fluid channels and cleaning fluid channels are provided in two different systems, and thus, for example, by forming the seating detection air channels 24 and the cleaning air channels 25 having mutually different channel cross-sectional areas, the air flow rate when detecting the seated state and the air flow rate when cleaning the seating surfaces can be changed. Specifically, the detection of the close-contact state of the main shaft device 1 and the tool 100, and the air cleaning of the close-contact portions of the main shaft device 1 and the tool 1 can be performed using respectively appropriate air flow rates.

Further, with the main shaft device according to the present invention, the communication of the seating detection fluid channels and a fluid channel, and the communication of the cleaning fluid channels and the fluid channel are respectively caused to communicate at different positions in a sliding action of a rod. Thus, for example, using the direction selector valve provided with the actuator or the like that causes the rod to slide, the timing at which the seating detection air channels 24 communicate with the second air channel 32 (the timing at which the rod 30 is positioned in the intermediate position), and the timing at which the cleaning air channels 25 communicate with the second air channel 32 (the timing at which the rod 30 is positioned in the unclamped position), can be controlled, a pressure reducing valve can be used to adjust the pressure, and the air flow rate of the air feed device 70 can thus be switched using the pressure reducing valve and the like. Specifically, the detection of the close-contact state of the main shaft device 1 and the tool 100, and the air cleaning of the close-contact portions of the main shaft device 1 and the tool 100 can be respectively performed using the appropriate air flow rate.

REFERENCE SIGNS LIST

1 Main shaft device
10 Main shaft head
11 Cylinder portion
12 Space of cylinder portion
20 Main shaft
21 Tapered hole (tapered surface)
22 Shaft hole
23 Tip end face (orthogonal face)
24 Seating detection air channel (seating detection fluid channel)
24a Opening portion
24b Opening portion 25 Cleaning air channel (cleaning fluid channel)
25a Opening portion
25b Opening portion
26 Inner peripheral surface
30 Rod
31 Outer peripheral surface
32 Second air channel (fluid channel)
32a Axial direction extending portion
32b Radial direction extending portion
40 Disk spring
50 Piston
51 First air channel (fluid feed device)
60 Collet
70 Air feed device (fluid feed device)
100 Tool (tool holder)
101 End face
102 Tapered portion
103 Engaging portion

The invention claimed is:

1. A main shaft device comprising:
a main shaft, onto a seating face of which is detachably mounted a tool that performs predetermined machining on an object to be machined or a tool holder to which the tool is attached;
a rod slidably supported by the main shaft and configured to attach or detach the tool or the tool holder to or from the main shaft through a sliding action;
a fluid channel formed in the rod;
fluid feed device configured to feed a fluid into the fluid channel;
a plurality of fluid channels for seating detection for detecting when the main shaft and the tool or the tool holder are in a seated state, the fluid channels for seating detection being formed in the main shaft so as to communicate with the fluid channel when the rod is positioned at a first position as a result of the sliding action; and
a plurality of fluid channels for cleaning for cleaning seating portions of the main shaft and the tool or the tool holder, the fluid channels for cleaning being formed in the main shaft so as to communicate with the fluid channel when the rod is positioned at a second position as a result of the sliding action, the second position being different from the first position, wherein
the rod is movable to a third position as a result of the sliding action, the third position being different from the first position and the second position, and
when the rod is positioned at the third position, the fluid channel communicates with neither the fluid channels for seating detection nor the fluid channels for cleaning.

2. The main shaft device according to claim 1, wherein
the first position is an intermediate position located between an unclamped position at which the tool or the tool holder is unclamped, and a clamped position at which the tool or the tool holder is reliably clamped,
the second position is the unclamped position, and
the third position is the clamped position.

3. The main shaft device according to claim 1, wherein
the seating face has an orthogonal face that is orthogonal to the main shaft and a tapered face oriented in a different direction to the main shaft and the orthogonal face,
each of the fluid channels for seating detection opens in the orthogonal face, and
each of the fluid channels for cleaning opens in the tapered face.

4. The main shaft device according to claim 1, wherein
the fluid channels for seating detection and the fluid channels for cleaning are alternately formed at intervals of a predetermined angle in a circumferential direction of the main shaft.

5. A machine tool comprising:
a main shaft device provided with a main shaft onto which is detachably mounted a tool that performs predetermined machining on an object to be machined or a tool holder to which the tool is attached, wherein
the main shaft device is the device according to claim 1.

* * * * *